US011212685B2

(12) United States Patent
Chae et al.

(10) Patent No.: US 11,212,685 B2
(45) Date of Patent: Dec. 28, 2021

(54) METHOD AND APPARATUS FOR MEASURING AND TRANSMITTING CR BY USER EQUIPMENT IN WIRELESS COMMUNICATION SYSTEM

(71) Applicant: LG Electronics Inc., Seoul (KR)

(72) Inventors: Hyukjin Chae, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 196 days.

(21) Appl. No.: 16/064,744

(22) PCT Filed: Feb. 2, 2018

(86) PCT No.: PCT/KR2018/001454
§ 371 (c)(1),
(2) Date: Jun. 21, 2018

(87) PCT Pub. No.: WO2018/143725
PCT Pub. Date: Aug. 9, 2018

(65) Prior Publication Data
US 2021/0211906 A1 Jul. 8, 2021

Related U.S. Application Data

(60) Provisional application No. 62/453,543, filed on Feb. 2, 2017.

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
CPC ......... H04L 47/12; H04L 47/30; H04L 43/12; H04L 47/11; H04L 47/24; H04L 27/0006;
(Continued)

(56) References Cited

U.S. PATENT DOCUMENTS

2013/0078924 A1  3/2013 Choudhury et al.
2016/0302230 A1* 10/2016 Novlan ................ H04J 11/0023
(Continued)

FOREIGN PATENT DOCUMENTS

JP  2006109169  4/2006
JP  2020506590  2/2020
(Continued)

OTHER PUBLICATIONS

Qualcomm Incorporated, "Congestion control for V2V," 3GPP TSG-RAN WG2 Meeting #96, dated Nov. 14-18, 2016, 14 pages.
(Continued)

*Primary Examiner* — Dady Chery
(74) *Attorney, Agent, or Firm* — Fish & Richardson P.C.

(57) ABSTRACT

One embodiment of the present invention relates to a method of measuring and transmitting a Channel occupancy Ratio (CR) by a user equipment in a wireless communication system, the method including measuring the CR evaluated as the number of subchannels related to a transmission of the UE in an interval in a predetermined size and performing the transmission based on the measured CR, wherein the interval in the predetermined size includes both a past time interval and a future time interval with reference to a timing at which the user equipment measures the number of the subchannels.

10 Claims, 11 Drawing Sheets (a)

(b)

(58) Field of Classification Search
CPC .................. Y02D 30/70; H04J 11/0023; H04J 2211/005; H04B 17/318; H04W 28/0289; H04W 88/06; H04W 24/10; H04W 74/0808; H04W 28/0236; H04W 24/06; H04W 52/346; H04W 52/362; H04W 72/10; H04W 28/0284; H04W 28/0268; H04W 40/244
See application file for complete search history.

(56) References Cited

U.S. PATENT DOCUMENTS

| | | |
|---|---|---|
| 2017/0034685 A1 | 2/2017 | Jiang et al. |
| 2020/0044971 A1* | 2/2020 | Gulati .................. H04W 24/06 |

FOREIGN PATENT DOCUMENTS

| | | |
|---|---|---|
| KR | 1020080109674 | 12/2008 |
| WO | WO2018132988 | 7/2018 |

OTHER PUBLICATIONS

Huawei et al., "WF on remaining issues of congestion control," 3GPP TSG RAN WG1 Meeting #87, dated Nov. 14-18, 2016, 5 pages.

CATT, "Discussion on CBR measurements," 3GPP TSG RAN WG1 Meeting #87, dated Nov. 14-18, 2016, 4 pages, 4 pages.

Samsung, "Discussion on congestion control," 3GPP TSG RAN WG1 #87. dated Nov. 14-18, 2016, 6 pages.

International Search Report in International Application No. PCT/KR2018/001454, dated May 18, 2018, 10 pages.

Huawei, HiSilicon, "WF on: CBR and CR definition for 36.214," R1-1704035, 3GPP TSG RAN WG1 Meeting #88, Athens, Greece, dated Feb. 13-17, 2017, 4 pages.

Japanese Office Action in Japanese Application No. 2019-542139, dated Nov. 10, 2020, 10 pages (with English translation).

Molina Masegosa, "V for Sidelink 5G V2X Vehicular Communications: A new 5G Technology for Short to Range Vehicle," Everything Commumcations, IEEE Vehicular Technology Magazine, dated Oct. 24, 2017, vol. 12, Issue 4, 10 pages.

Qualcomm Incorporated, "Congestion control for V2V," R2-168593, 3GPP TSG-RAN WG2 Meeting #96, Reno, USA, dated Nov. 14-18, 2016, 13 pages.

Korean Notice of Allowance in Korean Application No. 10-2018-7021050, dated Apr. 29, 2019, 3 pages (with English translation).

Panasonic, "Discussion on channel busy ratio measurement in V2X," R1-1609571, 3GPP TSG RAN WG1 Meeting #86bis, Lisbon, Portugal, Oct. 10-14, 2016, 3 pages.

3GPP_TSG_RAN_WG1 Archives, (Re: [87-16] Congention control for V2X (1), https://list.etsi.org/scripts/wa.exe?A2=ind1612A&L=3GPP_TSG_RAN_WG1&P=48764, dated Dec. 2, 2016, 8 pages.

3GPP_TSG_RAN_WG2 Archives, (Re: [96#63][LTE/V2X]—CBR—CATT, https://list.etsi.org/scripts/wa.exe?A2=ind1701D&L=3GPP_TSG_RAN_WG2&P=3485, Jan. 23, 2017), 22 pages.

* cited by examiner (a)

(b)

(a)

(b)

METHOD AND APPARATUS FOR MEASURING AND TRANSMITTING CR BY USER EQUIPMENT IN WIRELESS COMMUNICATION SYSTEM

CROSS-REFERENCE TO RELATED APPLICATIONS

This application is a National Stage application under 35 U.S.C. § 371 of International Application No. PCT/KR2018/001454, filed on Feb. 2, 2018, which claims the benefit of U.S. Provisional Application No. 62/453,543, filed on Feb. 2, 2017. The disclosures of the prior applications are incorporated by reference in their entirety.

TECHNICAL FIELD

The present invention relates to a wireless communication system, and more particularly, to a method and apparatus for a user equipment to measure and transmit a Channel occupancy Ratio (CR).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly without an evolved Node B (eNB). D2D communication may cover UE-to-UE communication and peer-to-peer communication. In addition, D2D communication may be applied to Machine-to-Machine (M2M) communication and Machine Type Communication (MTC).

D2D communication is under consideration as a solution to the overhead of an eNB caused by rapidly increasing data traffic. For example, since devices exchange data directly with each other without an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

Currently, discussion on V2X communication associated with D2D communication is in progress. The V2X communication corresponds to a concept including V2V communication performed between vehicle UEs, V2P communication performed between a vehicle and a UE of a different type, and V2I communication performed between a vehicle and an RSU (roadside unit).

DISCLOSURE OF THE INVENTION

Technical Task

The technical task of the present invention is to provide a method for a user equipment to measure a CR.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of measuring and transmitting a Channel occupancy Ratio (CR) by a user equipment in a wireless communication system, the method including measuring the CR evaluated as the number of subchannels related to a transmission of the UE in an interval in a predetermined size and performing the transmission based on the measured CR, wherein the interval in the predetermined size includes both a past time interval and a future time interval with reference to a timing at which the user equipment measures the number of the subchannels.

In another technical aspect of the present invention, provided herein is a user equipment in measuring and transmitting a Channel occupancy Ratio (CR) in a wireless communication system, the user equipment, including a transmitter and a receiver and a processor configured to measure the CR evaluated as the number of subchannels related to a transmission of the UE in an interval in a predetermined size and performing the transmission through the transmitter based on the measured CR, wherein the interval in the predetermined size includes both a past time interval and a future time interval with reference to a timing at which the user equipment measures the number of the subchannels.

It may be mandatory for the past time interval to be equal to or greater than the predetermined size within the interval in the predetermined size.

The CR may be measured per resource pool.

The CR may be measured after a resource pool of the user equipment has been changed.

The user equipment may change a parameter related to the transmission based on the measured CR.

The transmission parameter may include at least one of a transmit power, an RB size, a subchannel size, a retransmission count and a resource reservation interval.

A size of the interval may be 1,000 ms.

Advantageous Effects

According to an embodiment of the present invention, even if it is unable to correctly measure a CR for a past time interval due to a change of a resource pool or the like, the CR can be measured effectively.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
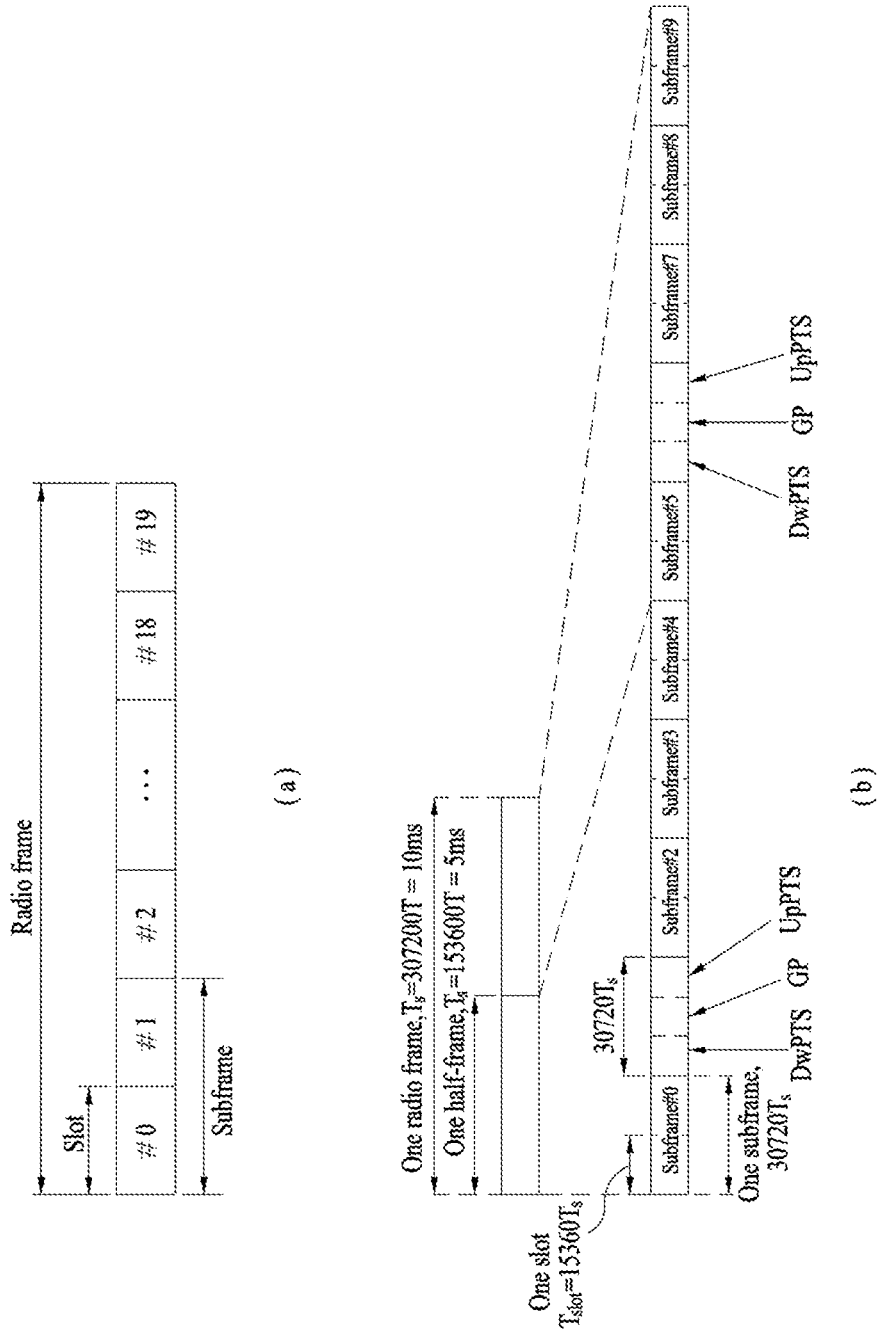
FIG. 1 is a diagram showing a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
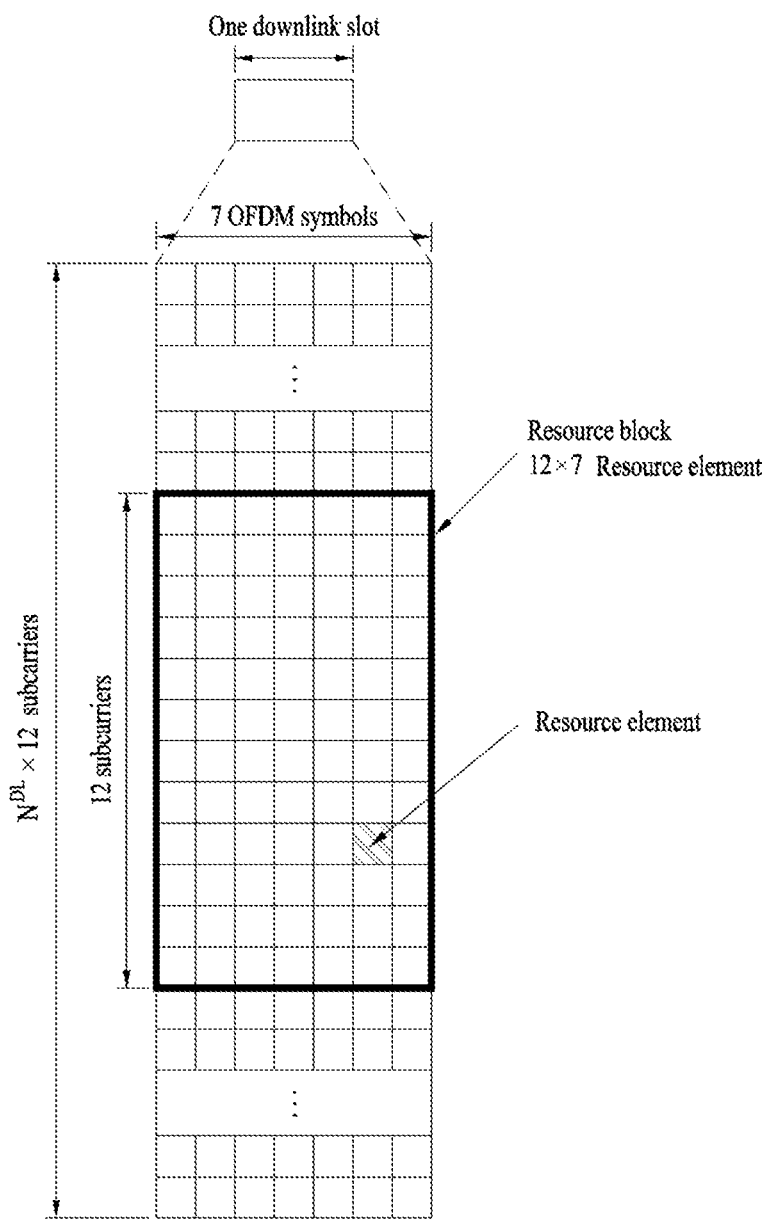
FIG. 2 is a diagram showing a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12x7 REs. The number of RBs in a downlink slot, NDL depends on a downlink transmission bandwidth. An uplink slot may have the same structure as a downlink slot.

Figure 3:
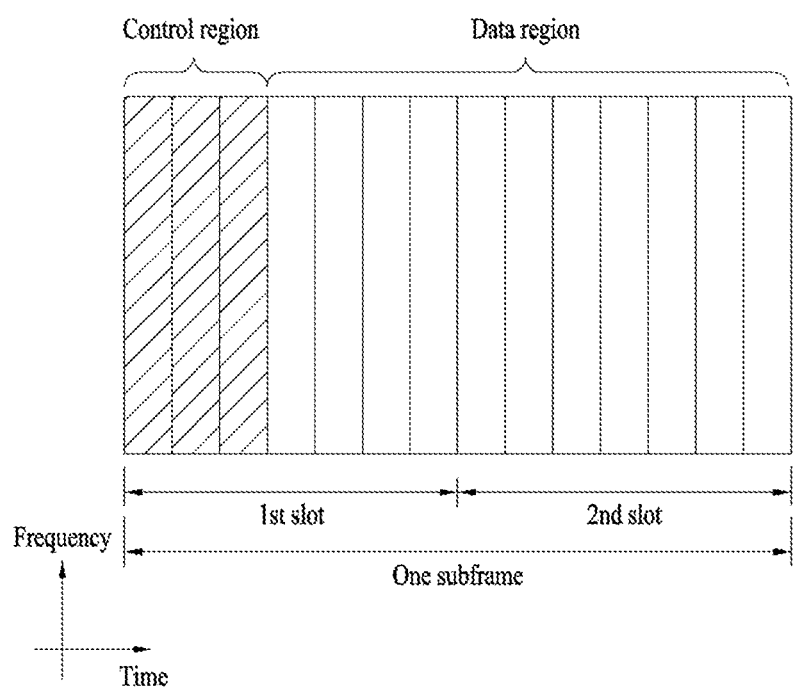
FIG. 3 is a diagram showing a structure of a downlink (DL) subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
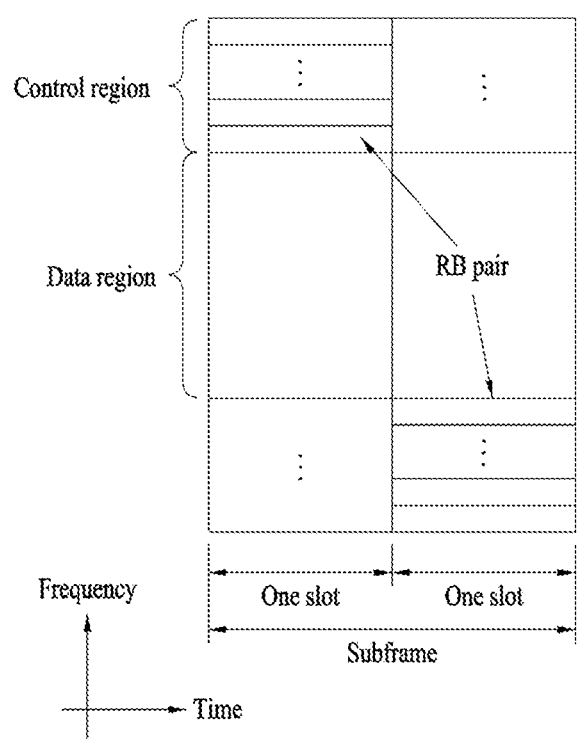
FIG. 4 is a diagram showing a structure of an uplink (UL) subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
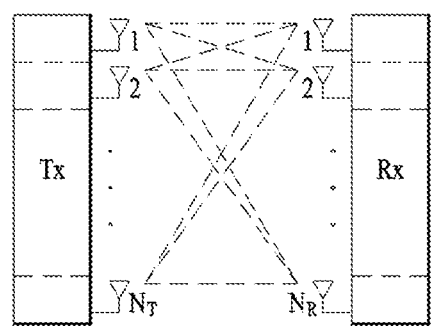
FIG. 5 is a diagram for configuration of a wireless communication system having multiple antennas.
Figure 5:
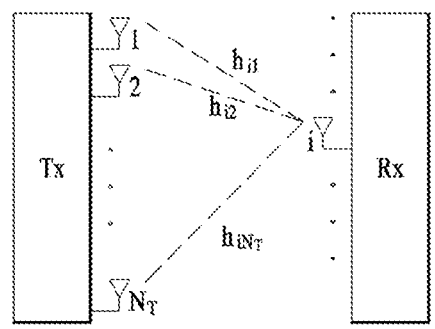

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$S = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $W_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}]$$ [Equation 7]

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix}$$ [Equation 8]

An AWGN (Additive White Gaussian Noise) is added to the actual channels after a channel matrix H. The AWGN $n_1$, $n_2$, ..., $n_{N_R}$ respectively added to the NR receive antennas can be expressed as follows.

$$n = [n_1, n_2, \ldots, n_{N_R}]^T$$ [Equation 9]

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R)$$ [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
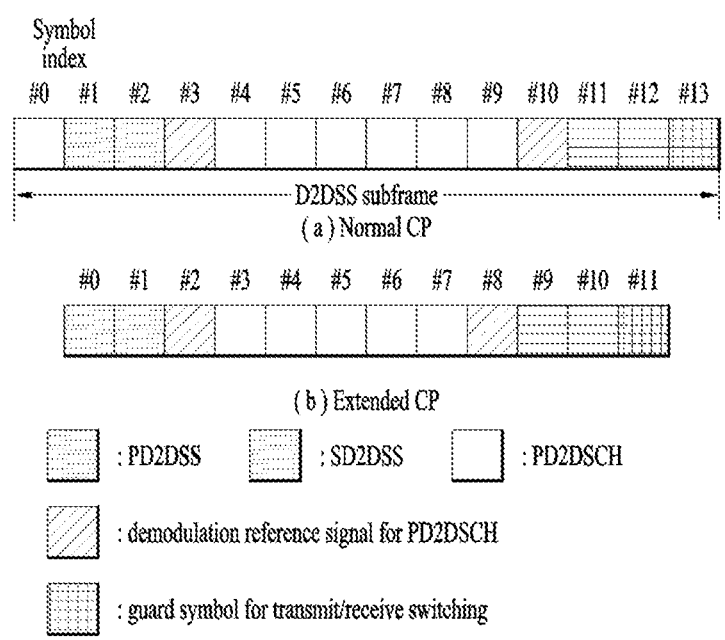
FIG. 6 shows a subframe for transmitting a D2D synchronization signal.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
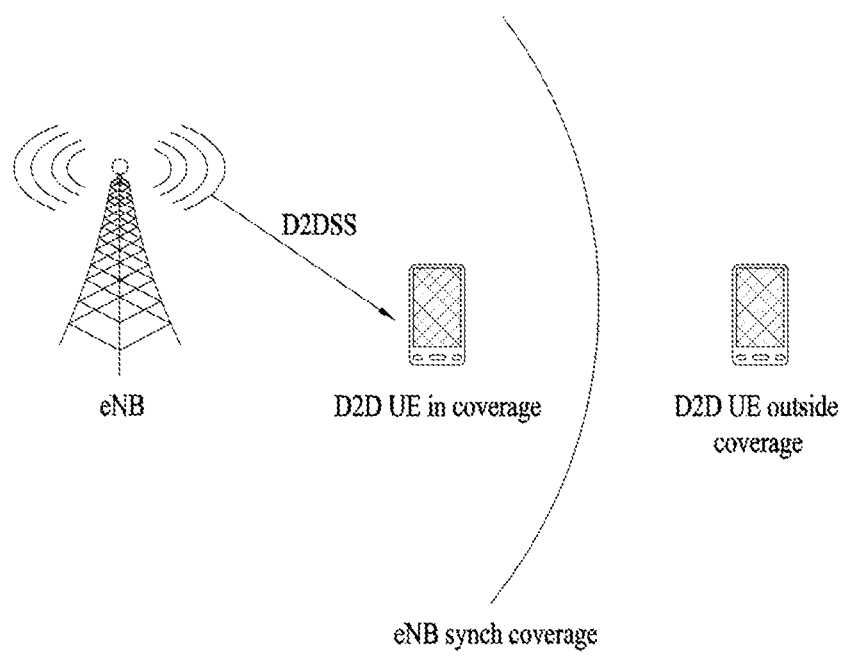
FIG. 7 is a diagram to describe a relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

Figure 8:
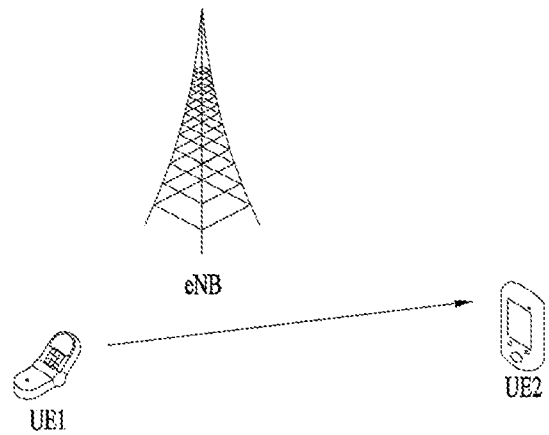
FIG. 8 shows an example of a D2D resource pool for D2D communication.
Figure 8:
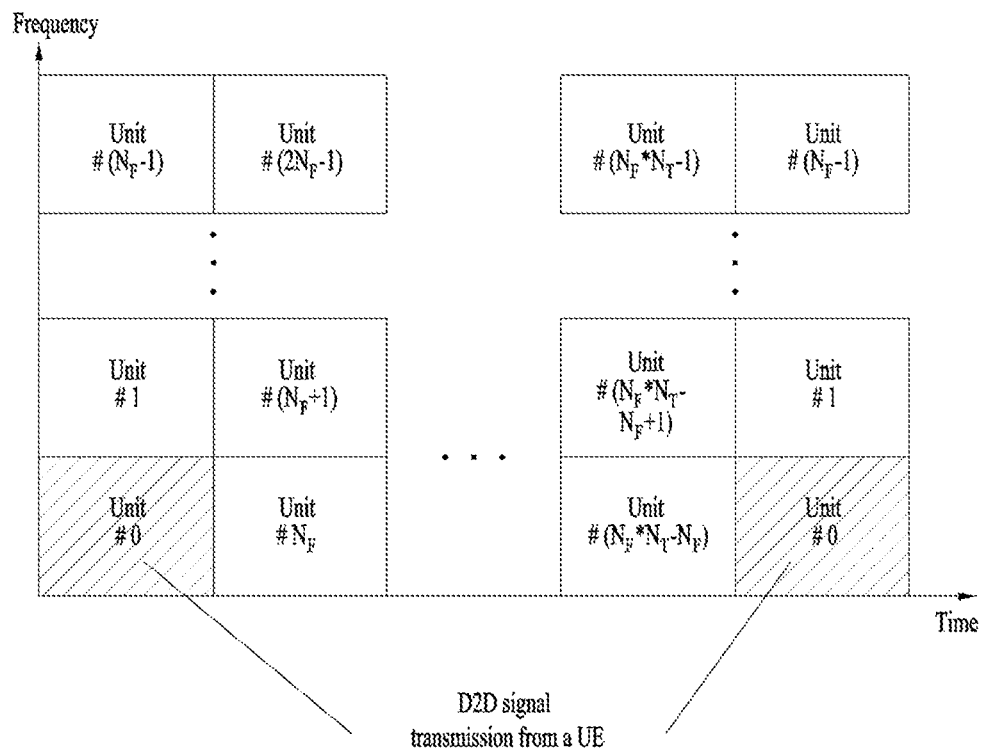

FIG. 8 shows an example of a UE1, a UE2 and a resource pool used by the UE1 and the UE2 performing D2D communication. In FIG. 8 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8 (b) shows an example of configuring a resource unit. Referring to FIG. 8 (b), the entire frequency resources are divided into the $N_F$ number of resource units and the entire time resources are divided into the $N_T$ number of resource units. In particular, it is able to define $N_F*NT$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
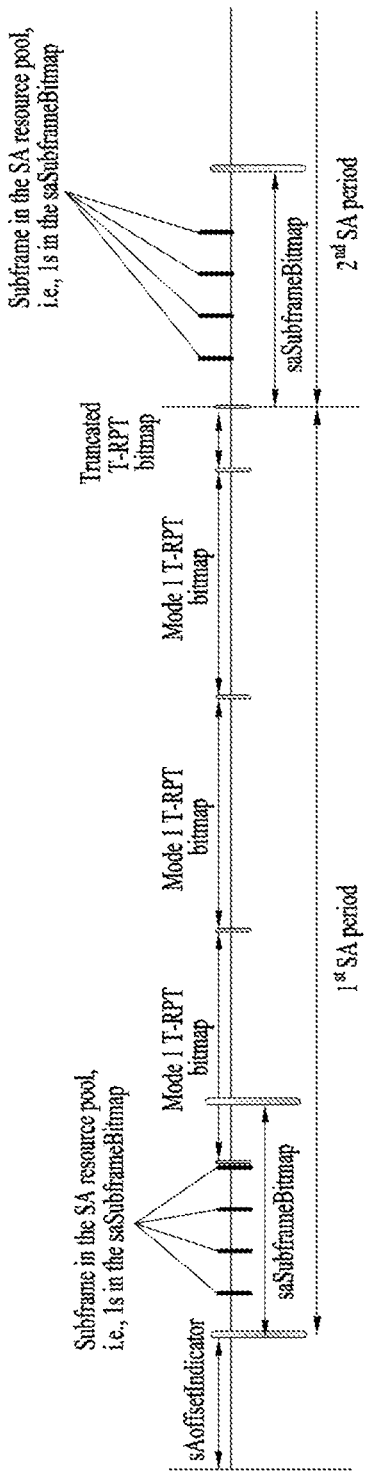
FIG. 9 is a diagram to describe an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes. A transmission UE performs transmission at a position where a T-RPT bitmap corresponds to 1 in an indicated T-RPT and 4 transmissions are performed in a MAC PDU.

In some implementations, in Vehicle-to-Vehicle (V2V) communication, a Cooperative Awareness Message (CAM) of a periodic message type, a Decentralized Environmental Notification Message (DENM) of an event triggered type and the like can be sent. Dynamic state information (e.g., a direction and a velocity) of a vehicle, a vehicle static data such as a size, basic vehicle information such as an external illumination state, a route history and the like can be contained in the CAM. A size of the CAM may range 50 to 300 bytes. The CAM is broadcasted and a latency should be smaller than 100 ms. The DENM may include a message created in case of an unexpected situation such as a vehicle breakdown, an accident or the like. A size of the DENM may be smaller than 3,000 bytes, and all vehicles within a transmission range can receive the corresponding message. In this case, the DENM may have a priority higher than that of the CAM. Here, having the higher priority may mean that when simultaneous transmissions occur in aspect of a single UE, a transmission having a higher priority is preferentially sent. Or, it may mean that it is intended to preferentially send a message having a high priority among several messages. In aspect of several UEs, a message of a high priority is rendered to receive interference smaller than that of a message of a low priority, whereby a reception error probability is lowered. In case that a security overhead is included, the CAM may have a message size larger than that of a case that the security overhead is not included. Regarding an embodiment of the present invention, 3GPP RAN1 #87 agreement is the related art of the present invention and can be used in a manner of being combined with the configuration of the present invention. Table 1 describes 3GPP RAN1 #87 agreement in part.

transmission period and the like. In doing so, depending on importance (or priority) of packets transmitted by the UEs, different transmission (Tx) parameters can be determined. Thus, if a UE recognizes an ambient situation and then changes a transmission parameter, such an operation shall be called a congestion control. With respect to such a congestion control, a UE having several resource pools allocated thereto can perform a separate congestion control in each pool.

For a congestion control, a UE can measure a Channel Busy Ratio (CBR) for ambient situation recognition. The CBR may be defined as a ratio of a resource determined as used by another UE to total resources. Whether each resource is used can be determined as the number of subchannels having RSSI exceed a predetermined threshold versus the total number of subchannels in a predetermined time interval, through whether a measured reception (Rx) power or RSSI measured on the corresponding resource exceeds the predetermined threshold.

A UE measures a CBR in a resource pool and then changes a CR (channel ratio or resource utilization: a ratio of a resource used by each UE to total resources), an MCS, an RB size (a subchannel size. Here, a subchannel means a size of a basic frequency resource having resource allocation occur therein on a D2D communication occurring band), a

TABLE 1

Agreement:
    Confirm the WA (100 ms in absolute time) of CBR measurement duration:
        RAN2 can discuss whether any high layer operation is needed on CBR measurement.
    A V-UE measures all the resource pools configured as transmission pools.
        FFS measurement on exceptional pools.
        It is up to RAN2 how to report multiple measurements.
    Adaptation of the allowed set of values of radio-layer parameters is supported for congestion control.
        Both eNB-assisted and UE autonomous transmission parameter (re)configuration are supported
        Transmission parameter (re)configuration based on CBR and priority are supported
            FFS which transmission parameters are (re)configured.
        FFS whether resource reselection is immediately triggered in the event of parameter adaptation
Agreement:
    An occupancy ratio metric is defined
        CR is defined as the total number of sub-channels used by the UE for its transmissions divided by the
        total number of configured sub-channels over a measurement period of [1000]ms
    Working assumption: The set of radio-layer parameters whose allowed values can be restricted by congestion control are the following:
        Maximum transmit power (including zero power transmission)
        Range on number of retransmissions per TB
        Range of PSSCH RB number (according to subchannel size)
        Range of MCS
        Maximum limit on occupancy ratio (CR_limit)
        FFS whether resource reservation interval needs to be included.
    Lookup table links CBR range with values of the transmission parameters for each PPPP
        Can be configured or preconfigured. Details up to RAN2.
        Up to 16 CBR ranges are supported
    FFS details of UE behavior, e.g.,
        When the UE transmits MAC PDUs with different priorities.
        When and how the UE drops packet transmissions
        Any possible impact on sensing and resource selection procedure (e.g., caused by CR_limit)
Agreement:
    Remove the bracket of [1000] ms in the occupancy ratio metric definition of CR.
        RAN2 can discuss whether any high layer operation is needed on CR measurement.
        FFS how frequently CR is measured, updated and whether it is further filtered or not.
    Confirm the working assumption on the set of radio-layer parameters
        FFS whether resource reservation interval needs to be included.

Embodiment

When UEs transmit signals, if the number of UEs is excessively big in surroundings (or, if an amount of interference is measured as excessively large), it is able to reduce influence on neighboring UEs in a manner that each individual UE changes a transmit power, a size of a used frequency resource, a size of a user time resource, a packet retransmission number, a transmission power, a resource reservation interval and the like entirely or in part, for each measured CBR. Here, a range of CR usable according to the CBR measured by the UE, a range of MCS, an RB size, a range of a size of a subchannel and the like can be signaled as a physical or higher layer signal by a network, and such parameters may be determined in advance for a UE out of a coverage.

Regarding the above-described CR, an embodiment of the present invention proposes a CR measuring method as described in the following.

A User Equipment (UE) according to one embodiment of the present invention may measure a CR evaluated as the number of subchannels related to a transmission of the UE within an interval in a predetermined size. Based on the measured CR, the UE can perform a transmission.

Here, the interval in the predetermined size may include both a past time interval and a future time interval with reference to a timing at which the UE measures the number of used subchannels. Particularly, a time interval (i.e., interval [n–Y, n+X]) corresponding to Y ms (or Y subframes) ahead of a timing (i.e., subframe n) for a UE to measure a CR and X ms (or X subframes) behind the timing (subframe) for measuring the CR [i.e., Y ms in the past and X ms in the future] can become a time interval for CR measurement. Here, it is mandatory for the past time interval to be equal to or greater than a predetermined size within an interval in a predetermined size. Namely, a size of Y may be determined in advance so as to be equal to or greater than a minimum predetermined value (e.g., Y=100) or signaled by a network. If an interval in the excessive past is not included, a CR is evaluated as a resource use expected in the future (not occurring actually) only. This may become a cause of inaccurate CR measurement/evaluation. Hence, if a ratio of an actually used resource is set equal to or greater than a predetermined value, it is meaningful in that a CR actually used by a corresponding UE is reflected. Moreover, when a value of U is too small, if a transmission is performed, an initial CR may be set too high. A size of an interval for measuring/evaluating the CR may be 1,000 ms. The UE can change a transmission relevant parameter based on the measured CR. Here, a transmission parameter may include at least one of a transmit power, an MCS, an RB size, a subchannel size, a retransmission count, and a resource reservation interval.

Figure 10:
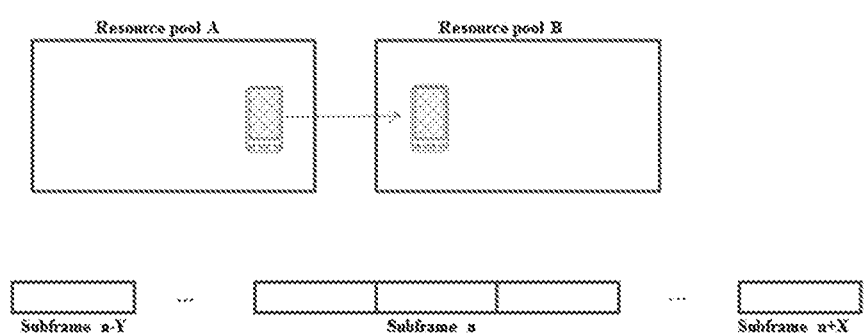
FIG. 10 is a diagram to describe one embodiment of the present invention.

This scheme may be interpreted as a method of calculating a CR as if 1,000 ms has passed by assuming that a transmission of a UE is repeatedly performed during Y ms in case that it is unable to measure a CR for 1,000 ms in the past (e.g., a case that a UE started V2X communication in a short time ago, a case that there is no past CR value due to a change of a pool, or a case that a CR value is 0 due to an absence of a subchannel used in the past). Particularly, for example, as shown in FIG. 10, if a UE (having 2 resource pools (resource pool A and resource pool B) configured therefor) changes the resource pool A into the resource pool B and then measures a CR in a subframe n, a subchannel, which is to be used (reserved) during a future time interval (subframe n ~subframe n+X) after the change of the resource pool, is included in the CR measurement. If a CR is measured for a past transmission only like the case of a general measurement without such configuration, information corresponding to a subframe n-Y to a subframe n–1 is measured or can be measured by the UE. Yet, this is the information which cannot be used for CR measurement in a new resource pool B due to the resource pool change. The reason for this is as follows. Since the UE continues to perform transmission on the resource pool A, a CR in the resource pool B shall be measured as 0. Therefore, eventually, there occurs a situation that the UE cannot measure a CR in the new resource pool B (or, a situation that a measured CR value becomes 0) on the other hand, according to the above-described embodiment of the present invention, by defining a CR as measurement for (past transmission+ future transmission), it is able to measure the CR despite that a pool is changed. Particularly, this may be regarded as following the property that a transmission is performed through a resource reservation during a predetermined time (e.g., 1,000 ms) in V2X and the like.

A CR may be measured per resource pool. A resource pool, which is used by a UE belonging to a specific location according to a location based resource pool division scheme, can be configured in advance or by a network. Here, the location based resource pool division scheme means a scheme of if a resource pool used according to a location of a UE is determined in advance and the location of the UE is moved, transmitting a signal on a resource pool allowed at the moved location only. In this case, the UE can measure a CBR per resource pool, whereby a CR can be separately measured per resource pool by the UE. The network can signal whether to measure a CBR and/or a CR in a prescribed resource pool, through a physical or higher layer signal.

For example similar to the above-described substance, in case that a specific resource pool is not used (i.e., a case that a CR is 0) for the past X ms (X is a window size for measuring a CR and may be 1,000 ms for example), it is able to consider a scheme of gradually increasing a size of a window for calculating a CR. For example, when Y ms has passed in a new resource pool and n transmissions were performed so far (or, n subchannels were used) (where Y is smaller than X), a CR is calculated as n'/X using an equation of Y:X=n:n'. Namely, although n' transmissions are not performed actually, a CR is calculated to correspond to the assumption that X ms is used. In doing so, when a value of Y is too small, if a transmission is performed, an initial CR may be set too high. Hence, a size of Y may be determined in advance so as to be equal to or greater than a minimum predetermined value (e.g., Y=100), or signaled by a network. For example, as a resource pool is changed, when a CR is 0, if a UE performs a transmission using 2 subchannels in 100 ms interval of the changed pool, a CR is calculated not as $2/1000=0.002$ but as $2/100=0.02$. If 4 subchannels are used for a next 200 ms interval, a CR can be calculated as $4/200=0.02$. In case that it is unable to measure a CR for 1.00 ms in the past (e.g., a case that a UE started V2X communication in a short time ago, or a case that there is no past CR value due to a change of a pool), such a scheme may be interpreted as a method of calculating a CR as if 1,000 ms passes in a manner of repeating UE's transmission for Y ms. For example, if a UE changes a pool and then performs a transmission using 2 subchannels during 100 ms, a CR is calculated on the assumption that 2*10 subchannels are used. Such a scheme of calculating a CR on the assumption that such a virtual transmission was performed is applicable until a time (e.g., X=1,000 ms) for an actual CR calculation is sufficiently secured.

For another example, if 2 resource pools (resource pool A, resource pool B) are configured for a UE, while the UE measures a CBR in the resource pool A and performs communication, as a location of the UE is moved, there may occur a case that the resource pool B is used. In doing so, a CBR result and/or a CR measurement result may not exist in the resource pool B. if there is no measured CBR after moving the resource pool or it is unable to measure a CBR effectively due to other reasons, it is able to perform a congestion control (e.g., determining CRlimit, RB size, MCS, retransmission number, resource reservation interval, transmit power, etc. entirely or in part) using a nominal CBR signaled by a network through a physical or higher layer signal (or a nominal CBR determined in advance). This embodiment may include an operation limited to a UE unable to measure a CBR. If a specific UE implements a transmitting circuit only but fails to implement a receiving circuit, it may not be able to measure a CBR effectively. As a network signals a nominal CBR value to such a UE, it is able to perform a congestion control or a transmission parameter adjustment. For example, such a UE may include a Pedestrian UE (P-UE). Unlike a vehicle UE, the P-UE may not be always monitoring a resource. (Reduction of UE's power consumption) Therefore, as the network signals a nominal CBR to such UEs, the P-UE can effectively perform an operation of a transmission parameter adjustment/congestion control effectively without directly measuring a CBR.

The above descriptions are not limited to D2D direct communication only but usable in uplink or downlink. In doing so, a base station, a relay node or the like can use the above-proposed method.

As examples for the aforementioned proposed schemes can be included as one of the implemented methods of the present invention, they can be apparently regarded as a sort of proposed schemes. Although the aforementioned proposed schemes can be implemented independently, they can be implemented in form of combination (or mergence) entirely or in part. A rule can be defined in a manner that a base station informs a UE of applicability information of the proposed methods (or, information on rules of the proposed methods) through predefined signaling (e.g., physical layer signaling, higher layer signaling).

Device Configuration According to Embodiment of Present Invention

Figure 11:
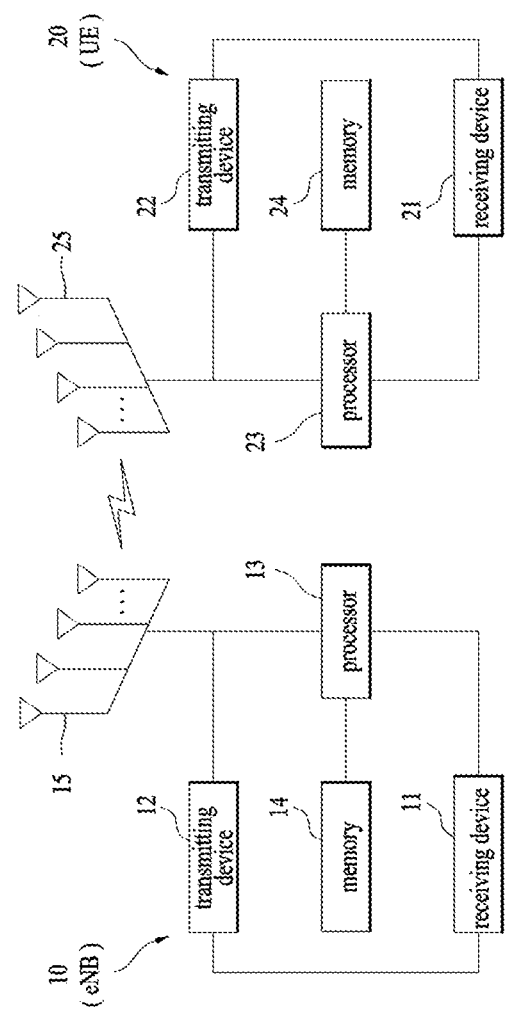
FIG. 11 is a diagram showing configuration of a transceiver device.

FIG. 11 is a diagram for a configuration of a transmitting point device and a user equipment device according to one embodiment of the present invention.

Referring to FIG. 11, a transmitting point device 10 according to the present invention may include a receiving device 11, a transmitting device 12, a processor 13, a memory 14 and a plurality of antennas 15. A plurality of the antennas 15 may mean a transmitting point device supportive of MIMO transmission and reception. The receiving device 11 can receive various signals, data and information in uplink from a user equipment. The transmitting device 12 can transmit various signals, data and information in downlink to the user equipment. And, the processor 13 can control overall operations of the transmitting point device 10. The processor 13 of the transmitting point device 10 according to one embodiment of the present invention can process or handle the items required for the respective embodiments mentioned in the foregoing description.

The processor 13 of the transmitting point device 10 performs functions of operating and processing information received by the transmitting point device 10, information to be transmitted by the transmitting point device 10, and the like. The memory 14 can store the operated and processed information and the like for a prescribed period and be substituted with such a component as a buffer (not shown in the drawing) and the like.

Referring still to FIG. 11, a user equipment device 20 according to the present invention may include a receiving device 21, a transmitting device 22, a processor 23, a memory 24 and a plurality of antennas 25. A plurality of the antennas 25 may mean a user equipment device supportive of MIMO transmission and reception. The receiving device 21 can receive various signals, data and information in downlink from a transmitting point. The transmitting device 22 can transmit various signals, data and information in uplink to the transmitting point. And, the processor 23 can control overall operations of the user equipment device 20.

The processor 23 of the user equipment device 20 according to one embodiment of the present invention can process or handle the items required for the respective embodiments mentioned in the foregoing description. Particularly, the processor may measure a CR evaluated as the number of subchannels related to a transmission of the UE in an interval in a predetermined size and perform a transmission through the transmitting device based on the measured CR. The interval in the predetermined size may include both a past time interval and a future time interval with reference to a timing at which the UE measures the number of the subchannels.

The processor 23 of the user equipment device 20 performs functions of operating and processing information received by the user equipment device 20, information to be transmitted by the user equipment device 20, and the like. The memory 24 can store the operated and processed information and the like for a prescribed period and be substituted with such a component as a buffer (not shown in the drawing) and the like.

In the above-mentioned detailed configurations of the transmitting point device and the user equipment device, the contents or items explained in the descriptions of the various embodiments of the present invention may be independently applicable or two or more embodiments of the present invention may be simultaneously applicable. And, redundant descriptions shall be omitted from the following description for clarity.

The description of the transmitting point device 10 with reference to FIG. 11 may be identically applicable to a relay node device as a DL transmitting entity or a UL receiving entity. And, the description of the user equipment device 20 with reference to FIG. 15 may be identically applicable to a relay node device as a UL transmitting entity or a DL receiving entity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description are applicable to various kinds of mobile communication systems.

What is claimed is:

1. A method of measuring and transmitting a Channel occupancy Ratio (CR) by a user equipment in a wireless communication system, the method comprising:
   measuring the CR which is evaluated as a ratio of a number of subchannels used for a sidelink transmission of the user equipment to a total number of subchannels in a CR measurement window; and
   performing the sidelink transmission based on the measured CR,
   wherein measuring the CR is performed per resource pool,
   wherein the CR measurement window includes both a first interval and a second interval with reference to a time-frequency resource N, and
   wherein the user equipment measures the CR based on subchannels which are used for the sidelink transmission in the first interval and subchannels which are assumed to be used for the sidelink transmission in the second interval.

2. The method of claim 1, wherein the first interval is larger than a predetermined interval.

3. The method of claim 1, wherein the measuring the CR is performed after a resource pool of the user equipment has been changed.

4. The method of claim 1, wherein the user equipment changes a parameter related to the sidelink transmission based on the measured CR.

5. The method of claim 1, wherein a size of the CR measurement window is 1,000 ms.

6. A user equipment configured to measure and transmit a Channel occupancy Ratio, CR, in a wireless communication system, the user equipment comprising:
   a transmitter and a receiver; and
   a processor configured to:
   measure the CR which is evaluated as a number of subchannels used for a sidelink transmission of the user equipment to a total number of subchannels in a CR measurement window; and
   perform the sidelink transmission through the transmitter based on the measured CR,
   wherein measuring the CR is performed per resource pool,
   wherein the CR measurement window includes both a first interval and a second interval with reference to a time-frequency resource N, and
   wherein the user equipment is configured to measure the CR based on subchannels which are used for the sidelink transmission in the first interval and subchannels which are assumed to be used for the sidelink transmission in the second interval.

7. The user equipment of claim 6, wherein the first interval is larger than a predetermined interval.

8. The user equipment of claim 6, wherein the CR is measured after a resource pool of the user equipment has been changed.

9. The user equipment of claim 6, wherein the user equipment changes a parameter related to the sidelink transmission based on the measured CR.

10. The user equipment of claim 6, wherein a size of the CR measurement window is 1,000 ms.

* * * * *